United States Patent [19]
Yahalom

[11] Patent Number: 4,622,949
[45] Date of Patent: Nov. 18, 1986

[54] FLOATING SOLAR POND AND ASSOCIATED POWER PLANT

[75] Inventor: Yona Yahalom, Rehovot, Israel

[73] Assignee: Solmat Systems, Ltd., Yavne, Israel

[21] Appl. No.: 622,243

[22] Filed: Jun. 19, 1984

Related U.S. Application Data

[63] Continuation of Ser. No. 415,905, Sep. 8, 1982, abandoned.

[30] Foreign Application Priority Data

Sep. 16, 1981 [IL] Israel ......................................... 63853

[51] Int. Cl.[4] ............................................... F24J 2/42
[52] U.S. Cl. .................................... 126/415; 126/430; 126/435; 60/641.8; 60/641.13
[58] Field of Search ............... 126/415, 416, 432, 435, 126/430, 450; 60/641.1, 641.8, 641.13; 4/498; 114/256, 74 T

[56] References Cited

U.S. PATENT DOCUMENTS

| | | | |
|---|---|---|---|
| 1,209,956 | 12/1916 | Gesell | 60/641.7 |
| 3,167,203 | 1/1965 | Ekstrand | 114/256 X |
| 3,327,667 | 6/1967 | Manning | 114/256 |
| 3,844,122 | 10/1974 | Bliss, Jr. | 114/256 X |
| 4,116,009 | 9/1978 | Daubin | 60/641.7 X |
| 4,283,913 | 8/1981 | Loeb | 126/415 |
| 4,339,626 | 7/1982 | Fisher et al. | 126/415 X |
| 4,350,143 | 9/1982 | Laing et al. | 126/436 X |
| 4,360,004 | 11/1982 | Testolini | 126/415 |
| 4,373,338 | 2/1983 | Van der Pot | 60/641.7 |

FOREIGN PATENT DOCUMENTS 820705  4/1936  France ..................... 126/415

*Primary Examiner*—Larry Jones
*Attorney, Agent, or Firm*—Sandler & Greenblum

[57] ABSTRACT

A floating solar pond includes a reservoir of an aqueous solution having a predetermined density, and structure for enclosing a body of solution and segregating it from the reservoir. The enclosed solution has an average density less than the density of the solution in the reservoir thereby causing the surface of the enclosed solution to be higher than the surface of the reservoir whereby a normal pressure is exerted on the hull in a direction outwardly therefrom and the hull is under tensile stress. Preferably, the hull is asixymmetrical and a co-axial pile, anchored to the bottom of the reservoir, constrains the hull by means of radially extending members connecting the pile to the hull. The pile is hollow and contains conduits through which heated brine passes to a power plant built on the pile.

26 Claims, 9 Drawing Figures

Fig. 2
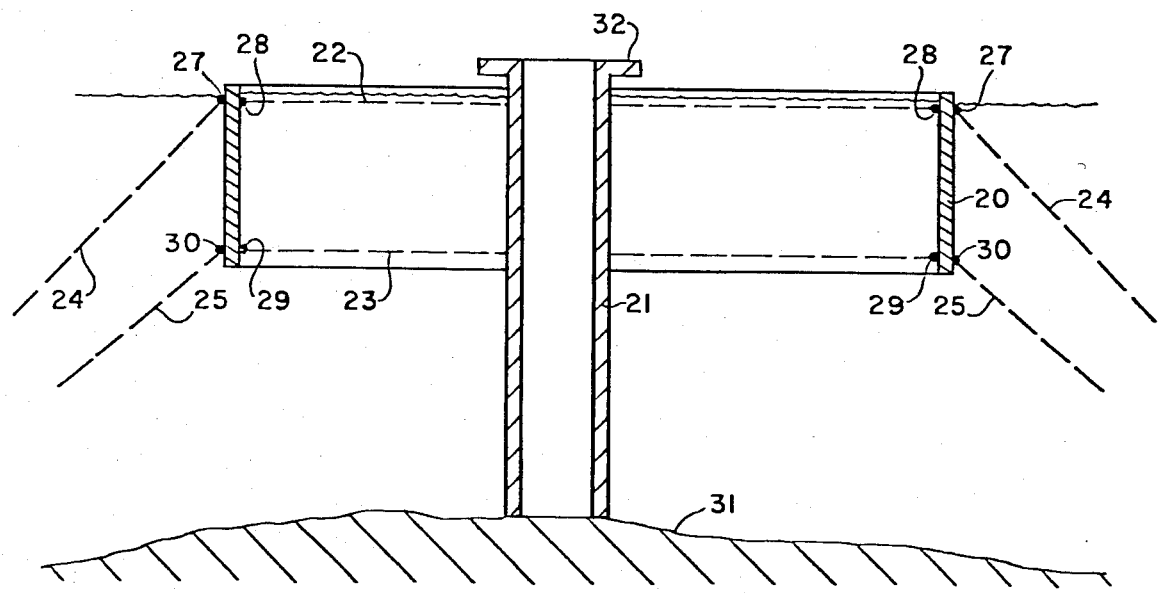
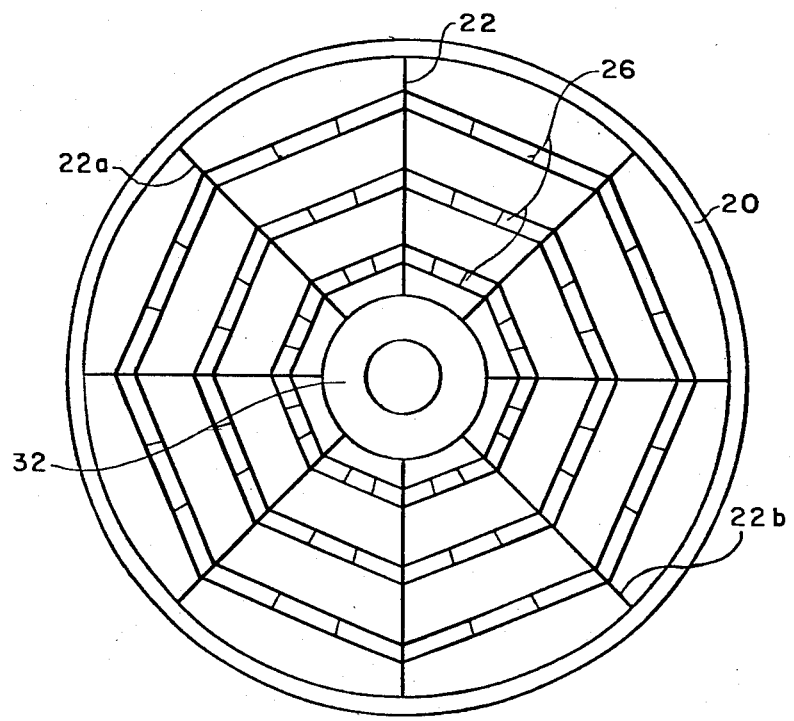
Fig. 3

FLOATING SOLAR POND AND ASSOCIATED POWER PLANT

This is a continuation of application Ser. No. 415,905 filed Sept. 8, 1982, now abandoned.

TECHNICAL FIELD

This invention relates to a floating solar pond and to a power plant associated with such pond.

BACKGROUND ART

A solar pond is a body of water characterized by a halocline which is a stratified layer located just below the surface wherein the density increases uniformly with depth establishing a non-convective zone, and pycnocline which is a stratified layer at the bottom of the pond having a density that increases with depth due to a corresponding temperature distribution. In consequence, solar radiation incident on the pond is absorbed in the halocline causing a heat gradient to build up such that the water below the halocline is heated, and may reach a temperature of 100° C. Heat can be extracted from the layer of water below the halocline for generating power.

Conventionally, solar ponds are constructed on land sites using dissolved salts to establish the required density distribution in the halocline. As is well known to people versed in the art, the possibility of permeation of the aqueous saline solution into the soil gives rise to severe economic, ecologic and geophysical problems.

Natural salt lakes exist in the world having a very high concentration of solutes such as the Dead Sea in Israel and the Great Salt Lake in the United States. Use of such natural salt lakes to establish of a floating solar pond has been suggested, i.e., by confining therein a body of saline solution with a halocline and pycnocline. In this way, so it has been argued, the severe economic, ecological and geophysical problems associated with the erection of solar ponds on land sites would be overcome. However, it was soon realized that in practice the confinement of such a body of aqueous solution gives rise to severe constructional problems which could hitherto not have been solved. In consequence, the idea of a floating solar pond has hitherto not progressed beyond a mathematical concept. It is therefore the object of the present invention to provide a structure for a floating solar pond, and a power plant therefor.

SUMMARY OF THE INVENTION

In accordance with the present invention there is provided a solar pond floating in a large size reservoir of an aqueous saline solution and comprising:

(i) a floating, axisymmetrical and bottomless hull having a vertical axis of symmetry and enclosing a body of aqueous saline solution having a base zone of uniform density equal to that of the aqueous saline solution surrounding the hull and an upper zone in which the density decreases continuously;

(ii) a central pile anchored in or moored to the bottom of said reservoir;

(iii) a plurality of pairs of radial connecting members connecting said hull and piles to each other and adapted to sustain the tensile stresses to which they are subjected in consequence of the static pressure prevailing within the hull, each of said pairs being symmetrically arranged with respect to said vertical axis of symmetry;

(iv) peripheral reinforcing means associated with said hull and said connecting members; and (v) said hull being of modular structure with the individual modules being oblong in vertical direction and adapted for thermal insulation.

The reservoir in which a floating pond according to the invention is located can be a natural or artificial lake holding saline water with a high degree of salinity such as, for example, the Dead Sea in Israel.

In the pond assembly, according to the invention, a hoop-stress exists in the hull which is connected to the central pile through flexible members that are subjected to tensile stress in consequence of the hydrostatic pressure prevailing inside the pond which exceeds that acting on the hull from the outside. In this way there ensues in the operational assembly a semi-rigid structure which is capable of withstanding the various dynamic forces acting on the hull from the outside and which are due to waves and currents. The connecting members may be in the form of cables, rods, beams, etc. which, if desired, may also be braced.

The height $h_o$ by which the level of the water inside the pond exceeds the level of the surrounding reservoir depends on the total height of the hull and the halocline and pycnocline inside the pond. These latter will be so selected such that the ensuing outwardly directed static loading will be sufficient to balance all the loadings coming from the opposite direction.

The axisymmetrical design of the hull is required for an even distribution of the static forces acting thereon. In a preferred embodiment the hull is cylindrical.

In large size solar ponds, floating nets are usually required in order to suppress wind mixing at the surface of the pond; and in a floating pond according to the invention such nets may be secured to the said connecting members.

The heat that accumulates in a solar pond according to the invention is extracted either by withdrawing hot aqueous solution below the halocline and subjecting this solution to heat exchange outside the pond, or alternatively by providing a heat exchanger in the pond and flowing a heat-carrier fluid therethrough. In either case ducting means are required for conducting liquid from and to the pond. In a preferred embodiment of the invention the pile is hollow and all the required ducting means are housed therein. Also, preferably the top of the pile is utilized for mounting thereon, a power generating unit operating on the heat that is extracted from the pond.

Due to the vertically elongated structure of the hull modules, the hull in a floating pond according to the invention is rigid in vertical direction yet possesses a certain degree of resilience in horizontal direction and it has been found in accordance with the invention that such a structure is ideal for coping with the various static and dynamic forces to which the hull itself is exposed in operation.

If desired the hull in a floating pond according to the invention may, in addition to being connected to the central file in the manner specified, also be moored to the bottom of the reservoir.

Embodiments of the invention are described below by way of examples and with reference to the accompanying drawings wherein:

FIG. 2 is a cross-section through a floating solar pond according to the invention;

FIG. 3 is a plan view of the pond of FIG. 2;

DETAILED DESCRIPTION

Figure 1:
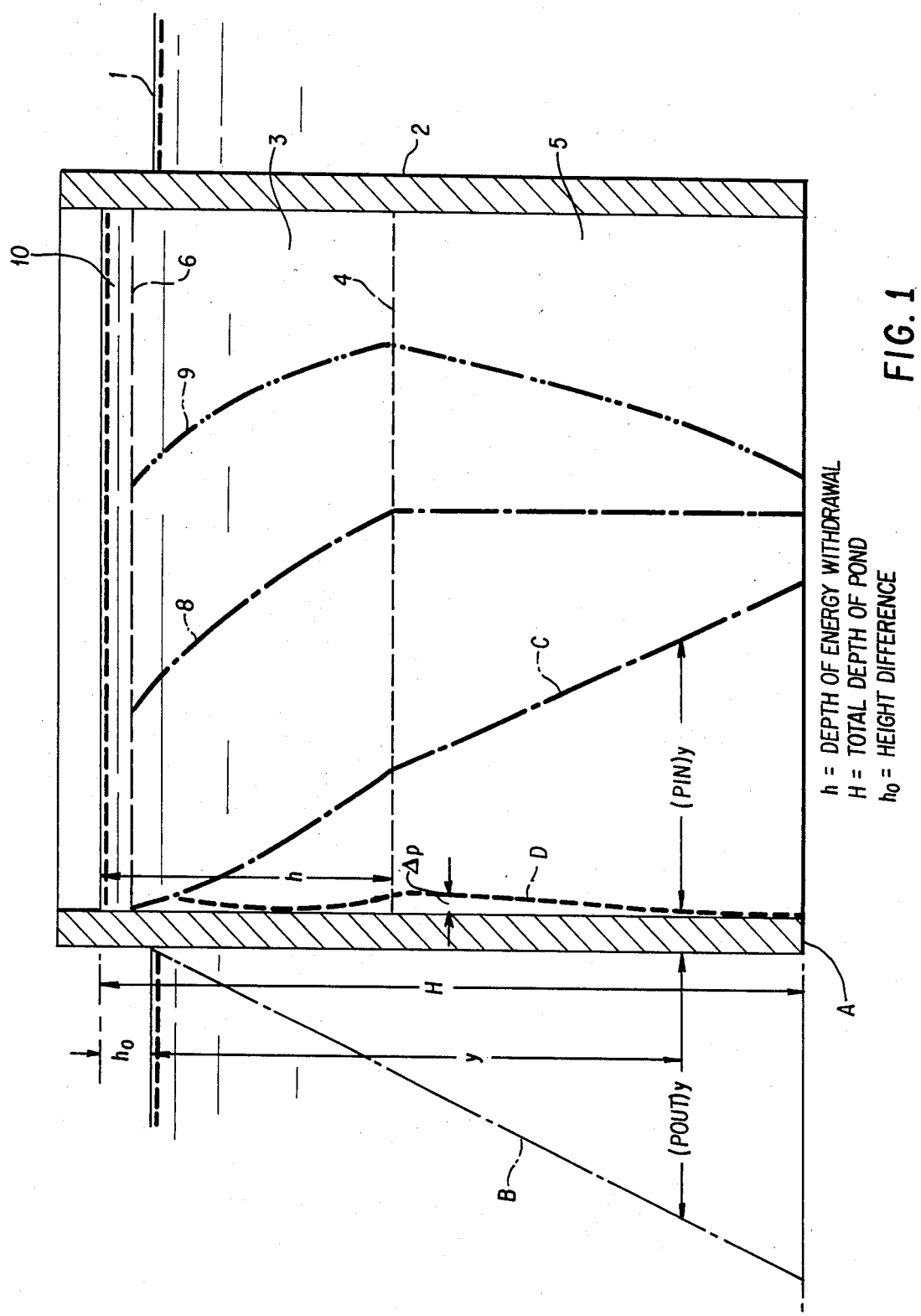
FIG. 1 is a diagrammatic illustration of a floating solar pond also showing the salt concentration and temperature gradients therein.

In FIG. 1, reference numeral 1 designates the surface of reservoir of an aqueous solution having a predetermined uniform density, such as a natural salt lake. Floating in the lake is axisymmetrical (i.e., symmetrical about a vertical axis) bottomless cylindrical hull 2 for enclosing a body of solution and segregating it from the lake, the segregating solution defining a floating solar pond. The solar pond is created by halocline 3, which is a body of saline solution whose concentration diminishes from bottom to top, the "bottom" being the interface 4 between it and a body of solution 5 of uniform concentration equal to that of the surrounding lake, while top 6 is the interface between body 3 and a so-called surface convective zone 7 or wind-mixed layer 10. To maintain the desired salinity profile, flushing water may be applied to layer 10 for washing away the excessive salt that diffuses upwards. The salinity or density profile of the halocline is depicted by dashed line 8; and it is seen that while the concentration increases more or less linearly within body 3 it remains constant within heat storage 5. The temperature profile through the pond is symbolized by dashed line 9 and it is seen that while the temperature in body 3 increases from top to bottom in direct proportion to the increase of salinity it decreases from interface 4 (the bottom) downwards in consequence of heat diffusion to the surrounding lake. Thus, from interface 4 downward the temperature is decreasing from top to bottom approaching the temperature of the surrounding lake at the hull bottom bed.

As the bodies of water inside and outside of the confinement 2 form a system of communicating vessels the lesser average density inside confinement 2 has to be made up by increased height. Accordingly, as shown in FIG. 1 the combined height of solutions 3, 5, and 10 exceeds surface 1 of the surrounding lake by $h_o$.

The hydrostatic pressure on both sides of confinement 2 is equal to the bottom edge A of the hull 2 while above it the pressure exerted on it from within exceeds the counterpressure from without, in consequence of and in proportion to the difference of height $h_o$ between the upper surface of wind-mixed layer 10 of the water inside confinement 2 and upper surface 1 of the surrounding lake.

As is well known, the static pressure at a given depth is the product of the average density at the depth and the depth itself, multiplication of the product by the gravitational constant providing the proper dimensions. Because the density is uniform outside the hull, the pressure outside varies linearly as indicated by curve B. The static pressure inside the hull, however, varies typically as indicated by curve C with the pressure inside and outside the hull being equal at bottom edge A. As a consequence of the greater height of liquid inside the hull, and the density profile of such liquid, the inside static pressure of a given depth, throughout most of the depth of the hull will exceed the outside static pressure producing a pressure difference indicated by curve D. The resultant pressure, which is normal for the hull surface, creates a circumferential tensile stress or hoop stress in the hull.

In addition to these static forces acting on hull 2 there are also dynamic forces due to the action of wind and waves. Wind induces surface currents within the pond and in the surrounding sea. Wind can also cause "storm tides" which is a change in the mean water level, as well as water set-up and corresponding tilting of the pycnocline within the pond which in turn can destroy the concentration gradient.

Waves whether "sea" waves or swell (which will be rare in seas with a short fetch), attack the pond's hull from the outside. Waves incident to and reflected from the walls induce the most significant dynamic forces in the pond's system. If the wave energy were transmitted to the interior of the pond it would agitate the latter with the result that the halocline, pycnocline and temperature gradient can be irrevocably upset and the pond would cease to function. Consequently, the hull should avoid a transfer of most of the wave energy from the surrounding sea into the pond.

In addition and above all, the wave forces acting on the hull are liable to break it.

Another problem related to the structure of the hull is the need for thermal insulation. This is required in order to avoid heat losses across the hull and also to eliminate the possibility of a "double diffusive" instability, i.e., the possibility of the formation of systems of convecting layers separated by thin interfaces due to intrinsic instability arising from the difference in the diffusion of heat and salt.

As shown in FIGS. 2 and 3, cylindrical hull 20 is connected to a central hollow pile 21 by an upper set of radial flexible cables 22 and a lower set of radial cables 23. Preferably, the cables are arranged pairwise, each pair being symmetrically disposed with respect to the central axis of symmetry of the pond so that when the pile 21 as illustrated in FIG. 3 by the pair 22a, 22b. The flexible cables are kept in tension by the internal pressure in the hull.

As is further seen from FIG. 3 the upper set of cables 22 is utilized for securing a plurality of floating nets 26 which serve to prevent agitation of the solution in the pond by the wind.

So as to provide for additional stability the hull 20 is also moored to the bottom of the sea by a plurality of cables 24 and 25 and there are provided upper and lower peripheral cables 27, 28, 29 and 30.

The inner hollow space of pile 21 can be used for installing therein ducting means required for the withdrawal of heat from the pond as well as other functional constituents. The top 32 can be used for installing thereon a power generating unit that is operated by the heat withdrawn from the pond as shown in FIG. 4.

Figure 4:
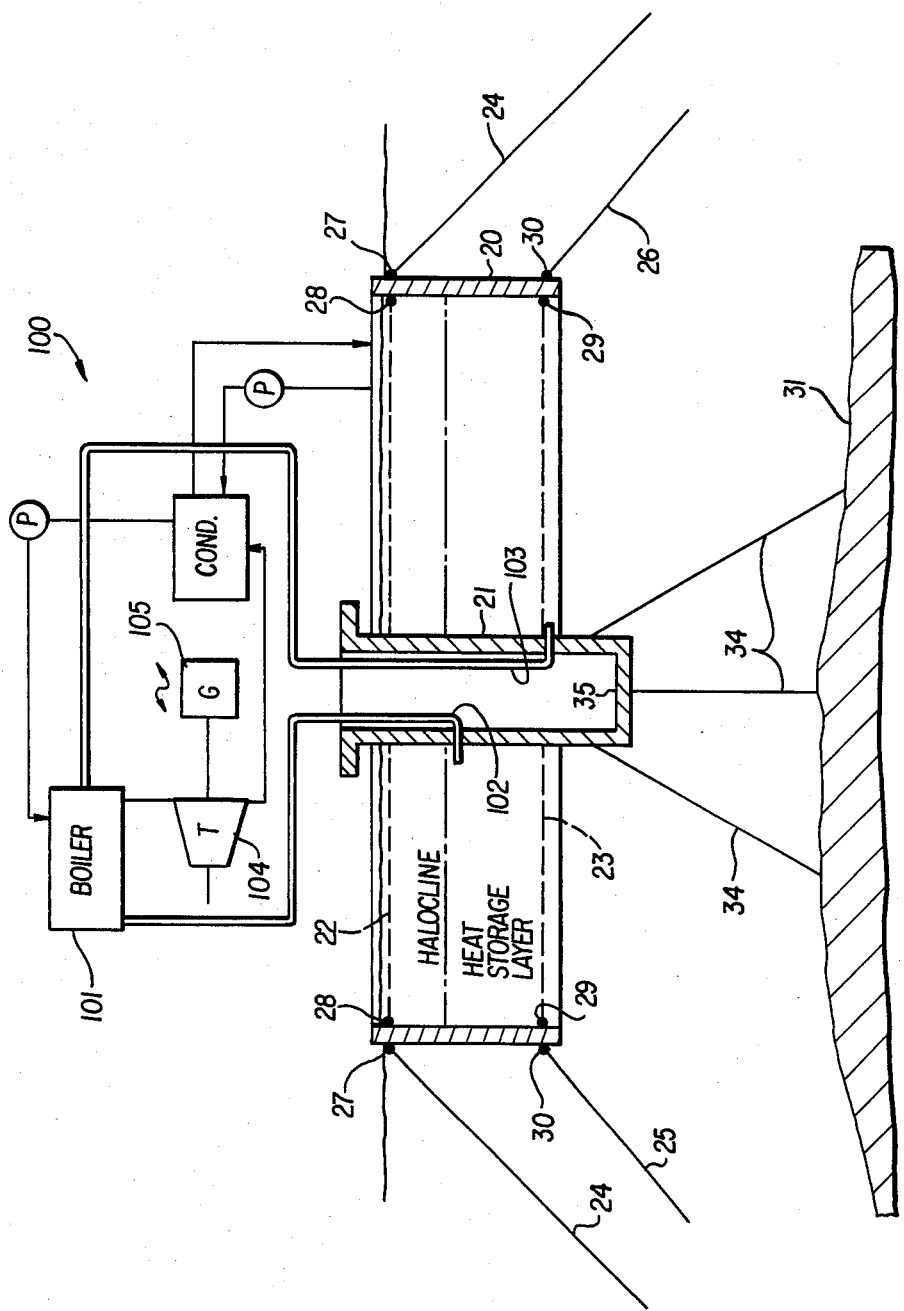
FIG. 4 is a cross-section through another embodiment of a floating solar pond according to the invention.

The embodiment of FIG. 4 is essentially similar to that of FIGS. 2 and 3 and similar parts are designated by the same numerals. However, in this case central pile 21 is also floating and is moored to the bottom 31 of the lake in which the floating pond is located, by means of cables 34. Also, the pile 21 comprises bottom 35 in order to keep out water.

Due to absorption of solar radiation by the solution segregated and confined within the hull, and the pressure of the halocline, the lower portion of the segregated solution, which is termed the heat storage layer, will become heated as indicated by temperature profile 9 in FIG. 1. Heat in the heat storage layer is available for useful work by pumping heated brine through conduction pipes inside pile 21 to power plant 100 which may be built atop the pile as shown in FIG. 4. Power plant 100 may include boiler 101 to which hot brine from just below the halocline is pumped via intake pipes 102 housed within hollow pile 21. After heat from the brine is extracted, preferably by an aqueous working fluid such as Freon, the cooled brine is returned by discharge pipe 103 to a region of the heat storage layer where the temperature of the cooled brine matches the temperature in the pycnocline.

Vaporized working fluid passes from the boiler to turbine 104 where the fluid expands thus causing the turbine to drive generator 105 which delivers power via a cable (not shown) to a shore installation. After the working fluid is exhausted from the turbine, it is condensed in condenser 106 which may be cooled by water taken from the wind-mixed layer in the pond; and the condensate is pumped back into the boiler.

Figure 5:
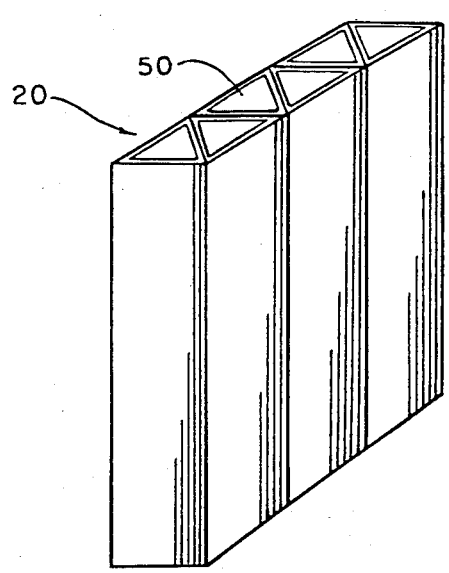
FIGS. 5 to 9 show various embodiments of the wall structure in a floating pond according to the invention.

FIGS. 5 to 9 illustrate, by way of example, some different embodiments of the modular structures. In the embodiment of FIG. 5 each module 50 is hollow and has a triangular profile and the inner and outer faces of the hull are essentially smooth.

Figure 6:
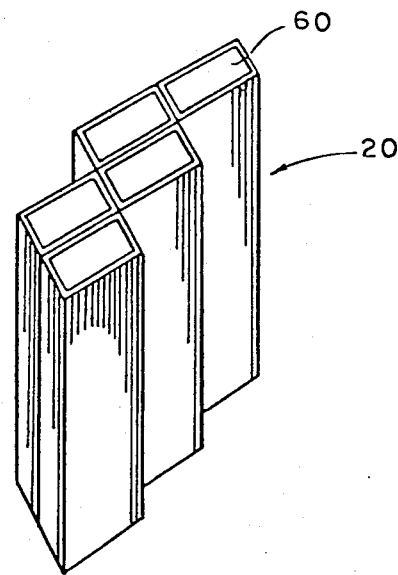

In the embodiment of FIG. 6 each module 60 is hollow and of rectangular profile and the outer and inner surfaces of the hull are stepped.

Figure 7:
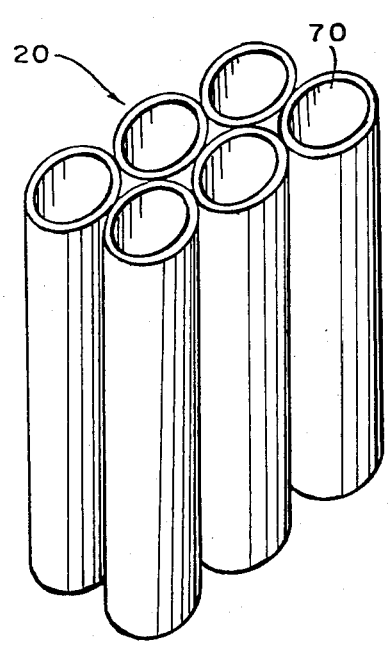

In the embodiment of FIG. 7 the hull comprises two staggered rows of hollow cylindrical modules 70 and the inner and outer surfaces of the hull 20 are undulated.

Figure 8:
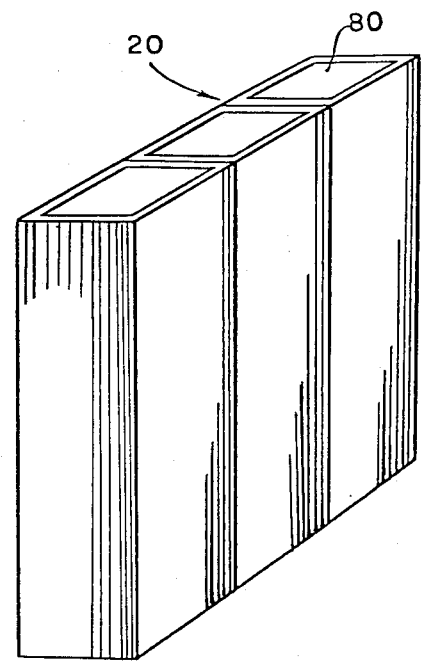

In the embodiment of FIG. 8 each tubular module 80 is rectangular prismatic and the inner and outer surfaces of hull 20 are again smooth.

Figure 9:
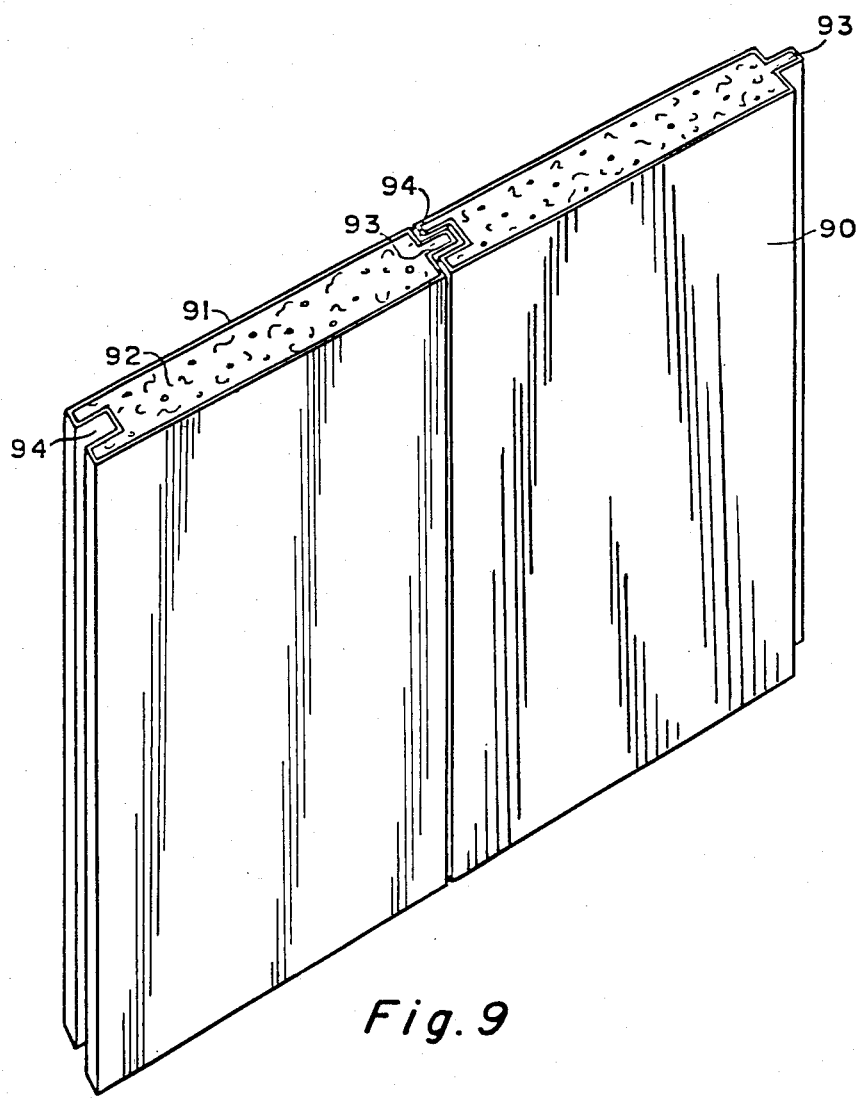

Finally, in the embodiment of FIG. 9 each module is in the form of a slab or panel 90 comprising an envelope 91, e.g., of fibre glass, and a filling 92, e.g., polyurethane. If desired, the lower part of the filling may be of a heavier material, e.g., concrete, so as to impart to the slab a desired weight. Each slab 90 comprises a ridge 93 and groove 94 and in this way the slabs are adapted for inter-engagement as shown.

It is believed that the advantages and improved results furnished by the method and apparatus of the present invention are apparent from the foregoing description of the preferred embodiment of the invention. Various changes and modifications may be made without departing from the spirit and scope of the invention as described in the claims that follow.

I claim:
1. A solar pond comprising:
   (a) a reservoir of an aqueous solution having a predetermined substantially uniform density;
   (b) a hull for enclosing a body of solution and segregating it from the reservoir; and
   (c) the enclosed solution including a multi-layer region comprising a halocline and a heat storage layer, said solution having an average density less than the density of the solution in the reservoir for causing the surface of the enclosed solution to be higher than the surface of the reservoir whereby a normal pressure is exerted on the hull in a direction outwardly therefrom and the hull is under tensile stress.

2. A solar pond according to claim 1 wherein the hull is axisymmetrical, the pond includes means for anchoring the hull in the reservoir, the last named means includes a pile anchored to the bottom of the reservoir, the axis of the pile is co-linear with the axis of the hull, and a plurality of radially extending members connecting the pile to the hull.

3. A solar pond according to claim 2 wherein the pile is anchored to the bottom of the reservoir by building one end of the pile into the bottom of the reservoir.

4. A solar pond according to claim 2 wherein the pile is anchored to the bottom of the reservoir by attaching the pile to flexible members that are built into the bottom of the reservoir.

5. A solar pond comprising a reservoir of an aqueous solution having a predetermined substantially uniform density; and axisymmetrical hull for enclosing a body of solution and segregating it from the reservoir; the enclosed solution having an average density less than the density of the solution in the reservoir for causing the surface of the enclosed solution to be higher than the surface of the reservoir whereby a normal pressure is exerted on the hull in a direction outwardly therefrom and the hull is under tensile stress, means for anchoring the hull in the reservoir including a pile anchored to the bottom of the reservoir, the axis of the pile being colinear with the axis of the hull, and a plurality of radially extending members connecting the pile to the hull, and wherein the enclosed solution has a multi-layer regime that includes a lowermost layer of uniform density equal to the density of the reservoir and directly connected thereto, and a halocline that covers the lowermost layer, the halocline having a density that decreases in an upward direction from the density of the reservoir.

6. A solar pond according to claim 5 wherein the multi-layer regime includes a wind-mixed layer covering the halocline and establishing the surface of the enclosed solution.

7. A solar pond according to claim 6 wherein floating nets are provided on the surface of the wind-mixed layer for suppressing wind-mixing, said nets being attached to the radially extending flexible members that connect the pile to the hull.

8. A solar pond according to claim 6 wherein the hull is cylindrical and comprises a plurality of modules which are elongated in the vertical direction.

9. A solar pond according to claim 8 wherein the modules are thermally insulated.

10. A solar pond according to claim 8 wherein the modules are hollow.

11. A solar pond according to claim 10 wherein the modules are cylindrical.

12. A solar pond according to claim 11 wherein the cylinders are circular in cross-section.

13. A solar pond according to claim 11 wherein the cylinders are rectangular in cross-section.

14. A solar pond according to claim 11 wherein the cylinders are triangular in cross-section.

15. A solar pond according to claim 11 wherein the cylinders are prismatic in cross-section.

16. A solar pond according to claim 9 wherein the modules are slabs that interlock along their vertical edges.

17. A solar pond according to claim 16 wherein the slabs are of insulating material.

18. A solar pond according to claim 6 wherein the pile is hollow.

19. A solar pond according to claim 18 wherein the pile has pipes that are connected to the lowermost region of the enclosed solution for effecting withdrawal and input of solution to the last mentioned layer.

20. A solar pond according to claim 18 including a power generating unit mounted on the pile and connected to the pipes.

21. A floating solar pond comprising:
(a) a reservoir of an aqueous solution having a predetermined substantially uniform density;
(b) an axisymmetrical hull in the reservoir having an open bottom and containing a body of solution whose density is less than the density of the solution in the reservoir for causing the surface of the body of the solution in the hull to be higher than the surface of the reservoir whereby normal pressure is exerted on the hull in a radial outward direction thereby placing the hull hunder tensile stress;
(c) means for anchoring the hull in the reservoir including a pile anchored to the bottom of the reservoir, the axis of the pile being colinear with the axis of the hull, and a plurality of radially extending members connecting the pile to the hull;
(d) said body of solution having a multi-layer regime that includes a lowermost layer of uniform density equal to the density of the reservoir and directly connected thereto, and an upper insluting layer covering the lowermost layer; and
(e) a power generating unit mounted on the pile for converting some of the heat in the lowermost layer of the enclosed solution into power.

22. A floating solar pond according to claim 21 wherein the pile is hollow.

23. A floating solar pond according to claim 22 wherein conduits connecting to the lowermost layer in the enclosed solution pass through the hollow pile.

24. A floating solar solar pond comprising:
(a) a reservoir of an aqueous solution having a predetermined substantially uniform density;
(b) an axisymmetrical hull in the reservoir having an open bottom and containing a body of solution having a multi-layer regime that includes a lowermost layer of uniform density equal to the density of the reservoir and directly connected thereto, and an insulating layer in the form of a halocline above the lowermost layer having a density that decreases in an upward direction from the density of the reservoir for causing the the surface of the body of the solution in the hull to be higher than the surface of the reservoir whereby normal pressure is exerted on the hull in a radial outward direction thereby placing the hull under tensile stress; and
(c) means for anchoring the hull in the reservoir including a pile driven into the bottom of the reservoir, the axis of the pile being colinear with the axis of the hull, and the plurality of radially extending members connecting the pile to the hull.

25. A floating solar pond according to claim 24 wherein the multi-layer regime includes a wind-mixed layer covering the insulating layer and establishing the surface of the enclosed solution.

26. A floating solar pond according to claim 25 wherein floating nets are provided on the surface of the wind-mixed layer for suppressing wind-mixing.

* * * * *

UNITED STATES PATENT AND TRADEMARK OFFICE
CERTIFICATE OF CORRECTION

PATENT NO. : 4,622,949

DATED : November 18, 1986

INVENTOR(S) : Yona YAHALOM

It is certified that error appears in the above-identified patent and that said Letters Patent is hereby corrected as shown below:

At column 3, line 24 change "convective zone 7 or wind layer 10" to ---connective zone 7 or wind-mixed layer 10---;

At column 3, line 31 change "storage 5." to ---storage layer 5.---;

At column 3, line 68 change "which is normal for the" to ---which is normal to the---; and At column 7, line 26 change "an upper insulting layer" to ---an upper insulating layer---.

Signed and Sealed this

Twenty-eighth Day of February, 1989

Attest:

DONALD J. QUIGG

*Attesting Officer*

*Commissioner of Patents and Trademarks*